US008792751B1

(12) United States Patent
Eftekhari et al.

(10) Patent No.: US 8,792,751 B1
(45) Date of Patent: Jul. 29, 2014

(54) IDENTIFYING AND CORRECTING CHARACTER-RECOGNITION ERRORS

(75) Inventors: Amir Eftekhari, San Diego, CA (US); Erikheath A. Thomas, San Diego, CA (US); Carol Ann Howe, San Diego, CA (US); George Thomas Ericksen, San Diego, CA (US); Gerald B. Huff, Berkeley, CA (US); Gang Wang, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 862 days.

(21) Appl. No.: 12/509,972

(22) Filed: Jul. 27, 2009

(51) Int. Cl.
*G06K 9/03* (2006.01)
*G06K 9/00* (2006.01)
*G06Q 40/00* (2012.01)

(52) U.S. Cl.
USPC ........... 382/309; 382/112; 382/137; 382/138; 382/140; 382/181; 382/310; 382/321; 705/31; 705/42

(58) Field of Classification Search
CPC . G06K 9/00; G06K 9/00442; G06K 9/00449; G06K 9/00469; G06Q 40/103
USPC ......... 382/309, 112, 137, 138, 140, 181, 310, 382/321; 705/31, 42
See application file for complete search history.

(56) References Cited

U.S. PATENT DOCUMENTS

| | | | |
|---|---|---|---|
| 6,741,724 B1 * | 5/2004 | Bruce et al. .................... 382/101 |
| 7,013,045 B2 * | 3/2006 | Sommer et al. ................ 382/181 |
| 7,234,103 B1 * | 6/2007 | Regan ............................ 715/234 |
| 7,548,885 B2 * | 6/2009 | Dutta et al. ...................... 705/43 |
| 7,978,900 B2 * | 7/2011 | Nepomniachtchi et al. .. 382/137 |
| 2002/0111888 A1 * | 8/2002 | Stanley et al. ................... 705/31 |
| 2003/0233296 A1 * | 12/2003 | Wagner ............................ 705/31 |
| 2006/0041450 A1 * | 2/2006 | Dugan .............................. 705/2 |
| 2006/0219773 A1 * | 10/2006 | Richardson .................... 235/379 |
| 2007/0033118 A1 * | 2/2007 | Hopkinson ...................... 705/31 |
| 2008/0319882 A1 * | 12/2008 | Wyle ................................ 705/31 |
| 2009/0012884 A1 * | 1/2009 | Harman et al. .................. 705/31 |

OTHER PUBLICATIONS

"Quick Fields Training Guide." LaserFiche. 2004.*

* cited by examiner

*Primary Examiner* — Michael A Newman
(74) *Attorney, Agent, or Firm* — Park, Vaughan, Fleming & Dowler LLP; Steven E. Stupp

(57) ABSTRACT

Embodiments of a computer system, a method and a computer-program product (e.g., software) for use with the computer system are described. These embodiments allow a user to provide an image of a document for use with software, such as an image of a financial document for use with financial software. In particular, the user can provide the image of the document, for example, by taking a picture of the document using a cellular telephone. This image may be converted into an electronic format that is suitable for text and numerical processing using a character-recognition technique, such as optical character recognition or intelligent character recognition. Errors in the electronic version of the document, if present, may be identified and corrected by comparing the electronic version to information maintained by a third party. This information may be accessed based at least on one or more items in the electronic version of the document.

17 Claims, 5 Drawing Sheets

IDENTIFYING AND CORRECTING CHARACTER-RECOGNITION ERRORS

BACKGROUND

The present disclosure relates to techniques for identifying and correcting errors that can occur when performing character-recognition operations on a document.

Character-recognition techniques are widely used to extract information from documents by converting data in an initial format (such as bitmap) into another format (such as ASCII). For example, optical character recognition (OCR) is often used to convert printed text to corresponding digital values, and intelligent character recognition (ICR) is often used to convert handwritten text to corresponding digital values.

However, the conversion performed by most character-recognition techniques is not perfect, and there is always a finite probability of errors. These errors can significantly complicate and increase the expense of subsequent processing of the extracted information. In addition, in applications where users provide the documents, the occurrence of errors often forces the users to review the converted information to identify and correct any errors. This is a time-consuming process, which degrades the user experience and reduces their confidence in products and services that use character recognition.

SUMMARY

One embodiment of the present disclosure relates to a computer system that identifies and corrects errors. During operation, the computer system receives, from a user, an image of a document that includes financial information, and the computer system performs character recognition on at least a portion of the image of the document to generate an electronic version of the financial information that is suitable for text and numerical processing. Then, the computer system accesses, from a third party, information stored in a computer-readable medium based at least on one or more items in the electronic version of the financial information. Next, the computer system compares the electronic version of the financial information and the accessed information to identify any errors in the electronic version of the financial information. If any errors are identified, the computer system corrects the errors in the electronic version of the financial information based at least on the accessed information.

Note that the character recognition may include optical character recognition and/or intelligent character recognition. Moreover, the image of the document may include an income-tax document, such as a W-2 statement or a 1099 form.

Additionally, the image of the document may include an image of a financial document. This image may be received via a wireless communication network. For example, the user may take a picture of the document using a portable electronic device, such as a cellular telephone, and may provide the picture to the computer system.

Furthermore, the third party may include a payroll provider or a financial institution that maintains financial records associated with the user, such as the information stored in the computer-readable medium. The location of this information may be determined based at least on the one or more items, such as a Social Security number of the user and/or an employer identification number of an employer of the user.

In some embodiments, the computer system identifies any additional errors in the electronic version of the financial information based at least on predefined financial calculations associated with the document. If any additional errors are identified, the computer system may correct the additional errors in the electronic version of the financial information based at least on the predefined financial calculations.

In some embodiments, the computer system completes a field in an income-tax document based at least on the corrected electronic version of the financial information.

Another embodiment provides a method including at least some of the above-described operations.

Another embodiment provides a computer-program product for use in conjunction with the computer system.

BRIEF DESCRIPTION OF THE FIGURES

Note that like reference numerals refer to corresponding parts throughout the drawings.

DETAILED DESCRIPTION

Figure 1:
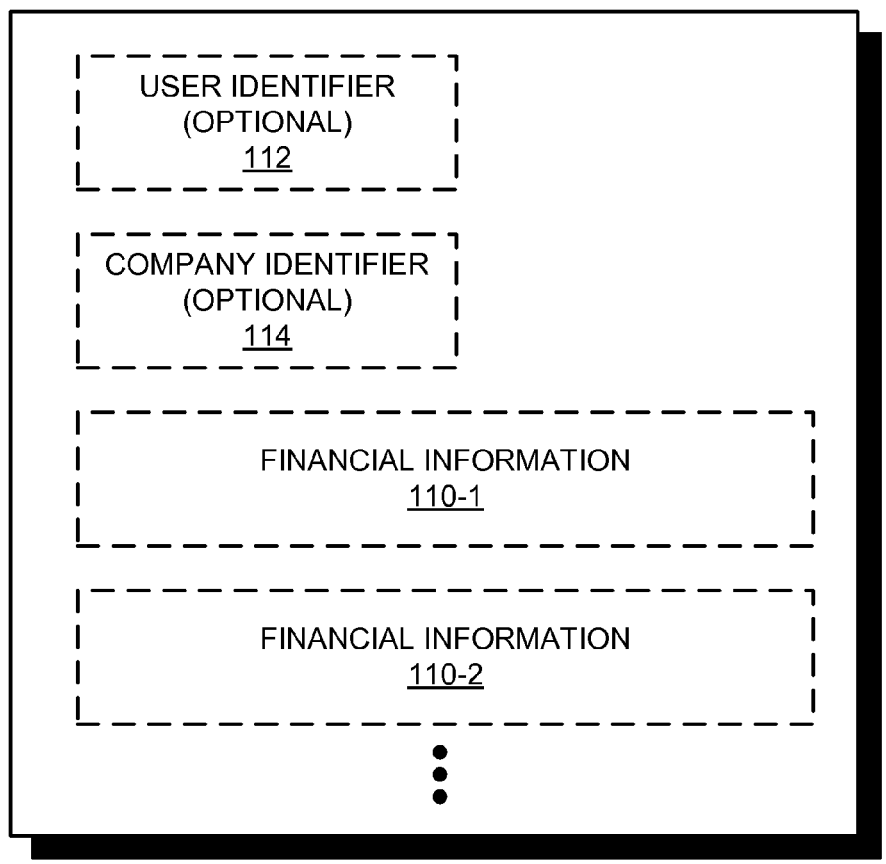
FIG. 1 is a block diagram illustrating a document in accordance with an embodiment of the present disclosure.

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a computer system, a method and a computer-program product (e.g., software) for use with the computer system are described. These embodiments allow a user to provide an image of a document for use with software, such as an image of a financial document for use with financial software. In particular, the user can provide the image of the document, for example, by taking a picture of the document using a cellular telephone. This image may be converted into an electronic format that is suitable for text and numerical processing using a character-recognition technique, such as optical character recognition or intelligent character recognition. Errors in the electronic version of the document, if present, may be identified and corrected by comparing the electronic version to information maintained by a third party. This information may be accessed based at least on one or more items in the electronic version of the document.

By identifying and correcting errors in the electronic version of the document, this technique may reduce the time and effort of the user of the financial software. For example, the amount of time that a user may subsequently spend checking the electronic version of the document for errors may be reduced or even eliminated. This, in turn, may improve the user experience and increase their confidence in the accuracy of the financial software, thereby increasing customer retention and sales of the financial software. Furthermore, by reducing or eliminating errors in the electronic version of the document, the complexity and expense of subsequent processing of information extracted from the electronic version of the document (such as text or numerical processing of the extracted information).

As an illustration, in the discussion that follows the document is a financial document, and the software is financial software, such as: payroll software, accounting software and/or income-tax software. However, the technique for identifying and correcting errors may be applied with various documents in a variety of applications. Consequently, in other embodiments the document may include information other than financial information, and the software may be other than financial software.

We now describe embodiments of a process for identifying and correcting errors. In order to perform financial calculations or generate an income-tax return, many financial software applications request that users provide supporting documents. For example, users of financial software may be requested to provide copies of: receipts, pay checks, direct-deposit receipts, W-2 statements or 1099 forms.

An example of such a document is shown in FIG. 1, which presents a block diagram illustrating a document 100. This document includes financial information 110 as well as one or more items, such as an optional user identifier 112 and/or an optional company identifier 114 (and, more generally, an identifier for an organization associated with the user). For example, the optional user identifier 112 may include the user's name and Social Security number, and the optional company identifier 114 may include: the company name, the company address and/or an employer identification number.

Financial information 110 may be subsequently used in financial calculations that are performed by the financial software, such as accounting or income-tax calculations. In order to perform the financial calculations, the financial software (or a provider of the financial software) may convert document 100 into an electronic format that is suitable for text and numerical processing (such as ASCII or another suitable digital format). Typically, such an electronic version of document 100 may be generated using a character-recognition technique, such as optical character recognition and/or intelligent character recognition. In particular, the character-recognition technique may be performed on a scanned image of document 100. (Alternatively, the user may provide an image of document 100, such as a photograph taken with a digital camera.) However, these character-recognition techniques are not 100% accurate. Indeed, error rates as high as 20-30% can occur when converting documents, such as document 100, into the electronic format.

To address this problem, the financial software (or a provider of the financial software) may use one or more items in document 100 and/or the electronic version of document 100, such as optional user identifier 112 and/or optional company identifier 114, to access stored information associated with the user (or the user's employer). This stored information may be maintained in financial records associated with the user (or the user's employer) by a third party. For example, the third party may be a payroll provider, and the stored information may include payroll records for the user that can be accessed based at least on one or more of the items, such as: the user's name, the user's Social Security number, the employer name, the employer's address, the employer's employer identification number, etc. Alternatively, the third party may be a financial institution (such as a credit-card provider, a bank, a stock broker, etc.), and the stored information may include financial transactions (such as direct deposits, withdrawals, payments, stock purchases, stock sales, etc.) that are accessed based at least on one or more of the items.

Then, the financial software may compare at least a portion of document 100, such as financial information 110, with the accessed information from the third party. In this way, the financial software may identify errors, if any, in the electronic version of document 100. If any errors are found, the financial software may correct them using the accessed information. Alternatively, the financial software may replace at least portions of financial information 110 in the electronic version of document 100 with the accessed information, which is deemed more reliable than the electronic version generated using character recognition.

Furthermore, the financial software may also identify and correct errors in the electronic version of document 100 based at least on predefined financial calculations associated with document 100. For example, if document 100 is a W-2 statement, the predefined financial calculation may include an amount of state or federal withholding based at least on the reported income, wages and tips, or an amount of Social Security or Medicare withholding based at least on the reported income, wages and tips. If there is a difference between a calculated value of one of these withholdings and the amount in the electronic version of document 100, an error may have occurred when character recognition was performed on document 100. This error may be corrected based at least on the calculated value. Alternatively or additionally, the financial software may use additional resources (such as information maintained by a third party) to correct such an error.

In this way, the financial software may significantly reduce or eliminate errors in the electronic version of document 100. Financial information 110 in the corrected electronic version of document 100 may be subsequently used to populate fields in additional documents. For example, the financial software may complete a field in an income-tax document using financial information 110 in the corrected electronic version of document 100.

Figure 2:
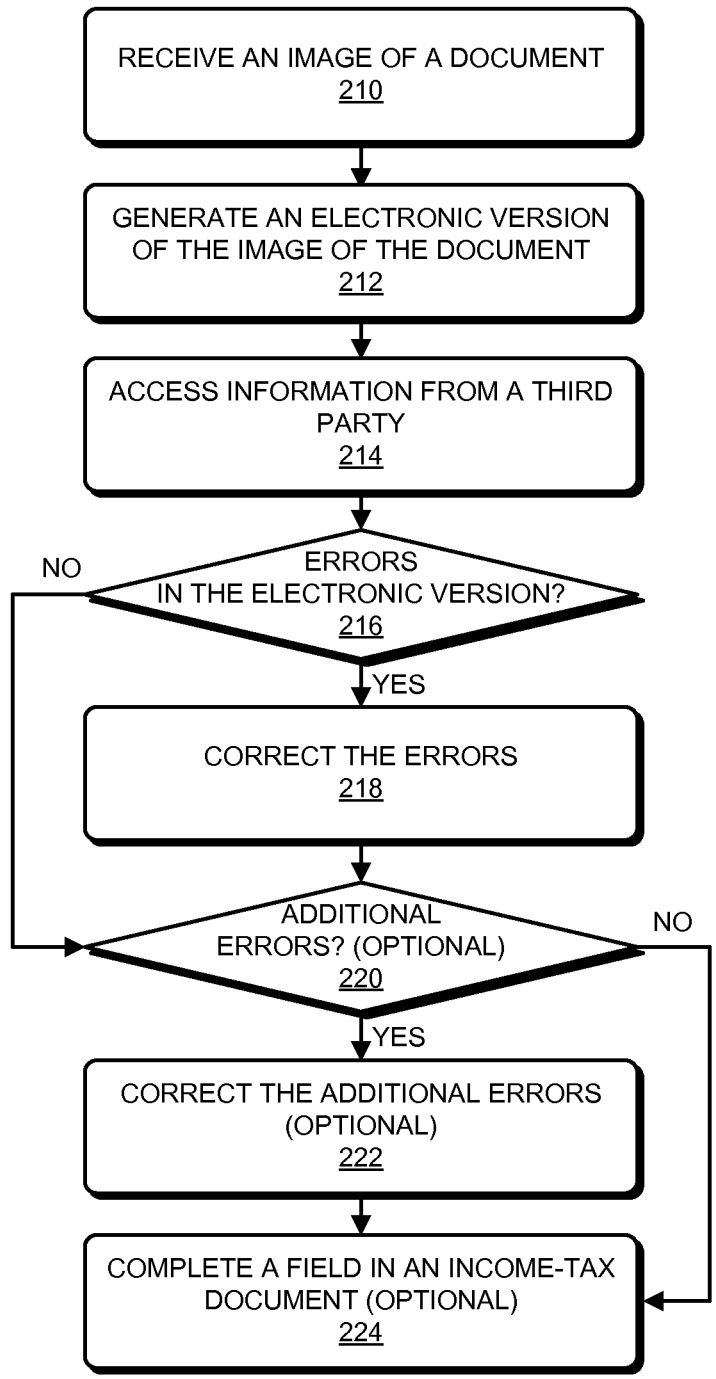
FIG. 2 is a flow chart illustrating a process for identifying and correcting errors in an electronic version of the document in FIG. 1 in accordance with an embodiment of the present disclosure.

FIG. 2 presents a flow chart illustrating a process 200 for identifying and correcting errors in an electronic version of document 100 (FIG. 1), which may be performed by a computer system. During operation, the computer system receives, from a user, an image of a document that includes financial information (operation 210), and the computer system performs character recognition on at least a portion of the image of the document to generate an electronic version of the financial information that is suitable for text and numerical processing (operation 212). Then, the computer system accesses, from a third party, information stored in a computer-readable medium based at least on one or more items in the electronic version of the financial information (operation 214). Next, the computer system compares the electronic version of the financial information and the accessed information to identify any errors in the electronic version of the financial information (operation 216). If any errors are identified (operation 216), the computer system corrects the errors in the electronic version of the financial information based at least on the accessed information (operation 220).

After operation 218, or if no errors are identified (operation 216), the computer system optionally identifies any additional errors in the electronic version of the financial information based at least on predefined financial calculations associated with the document (operation 220). If any additional errors are identified (operation 220), the computer system may correct the additional errors in the electronic version of the financial information based at least on the predefined financial calculations (operation 222).

Subsequently, or if no additional errors are identified (operation 220), the computer system may optionally complete a field in an income-tax document based at least on the corrected electronic version of the financial information (operation 224).

In some embodiments of process 200, there may be additional or fewer operations. For example, rather than identifying and correcting errors (operations 216 and 218), the financial software may simply replace at least portions of financial information 110 in the electronic version of document 100 with the accessed information. Moreover, the order of the operations may be changed and/or two or more operations may be combined into a single operation.

In an exemplary embodiment, document 100 (FIG. 1) includes an image of a W-2 statement that a user takes with a camera in a cellular telephone, and subsequently provides to the financial software via a network (such as a wireless network associated with a cellular service provider). The financial software may convert this image of the W-2 statement into an electronic format that is suitable for text and numerical processing (for example, from a bitmap format to ASCII) using optical character recognition. Then, the financial software may access the original W-2 statement, which is stored by a payroll provider. For example, the original W-2 statement may be accessed using the user's Social Security number and an employer identification number that are included in the image of the W-2 statement. Next, the financial software may identify errors in the electronic version of the image of the W-2 statement by comparing the electronic version of the image of the W-2 statement with the accessed original W-2 statement. If any errors are found, the financial software may correct them using the accessed original W-2 statement for the correct values. Alternatively, the financial software may simply replace the financial information in the electronic version of the image of the W-2 statement with the accessed original W-2 statement. (Either of these approaches may reduce or eliminate any errors in the financial information associated with the optical character recognition.) Moreover, the corrected financial information may be subsequently used by the financial software to complete an income-tax return for the user.

Figure 3:
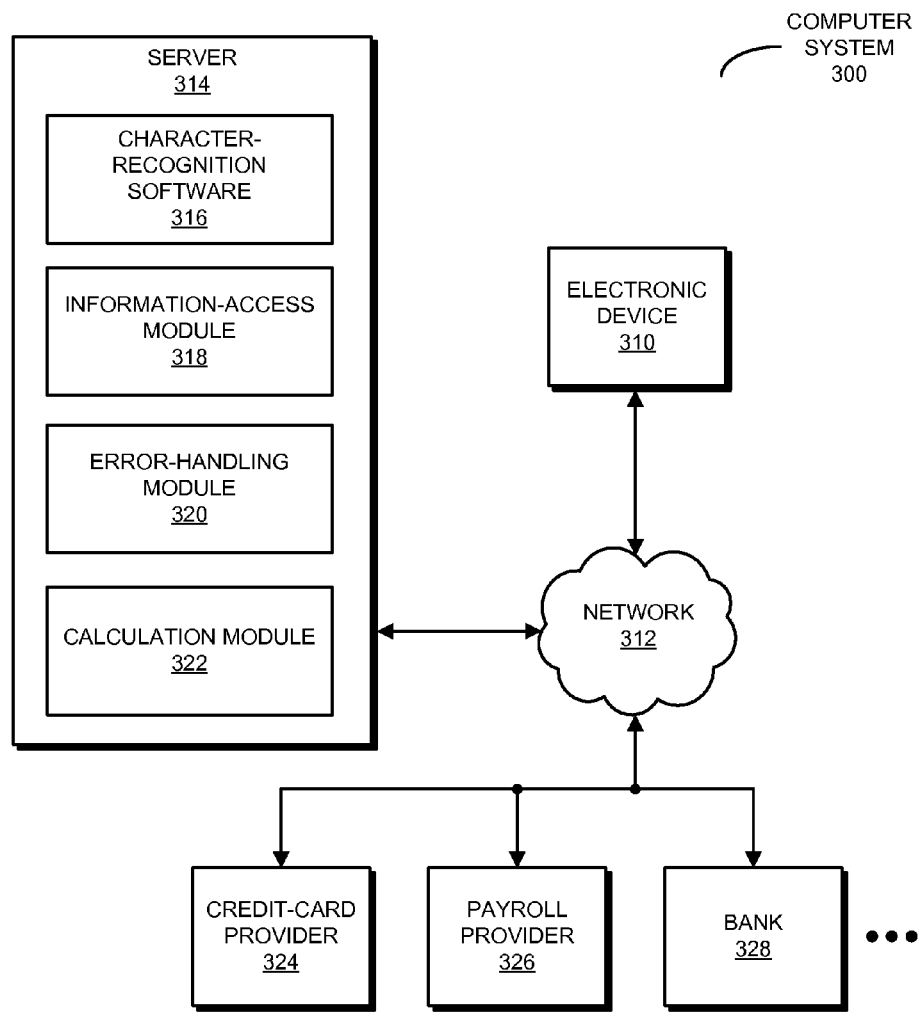
FIG. 3 is a block diagram illustrating a networked computer system that identifies and corrects errors in an electronic version of the document of FIG. 1 in accordance with an embodiment of the present disclosure.

We now describe embodiments of a computer system that performs process 200. FIG. 3 presents a block diagram illustrating a networked computer system 300 that identifies and corrects errors in an electronic version of document 100 (FIG. 1). In this computer system, a user of electronic device 310 (such as a computer and/or a cellular telephone) may use financial software. This financial software may be a stand-alone application or a portion of another application that is resident on and which executes on electronic device 310. Alternatively and/or additionally, at least a portion of the financial software may be a financial-software application tool (provided by server 314 via network 312) that is embedded in a web page (and which executes in a virtual environment of a web browser). In an illustrative embodiment, the software-application tool is a software package written in: JavaScript™ (a trademark of Sun Microsystems, Inc.), e.g., the software-application tool includes programs or procedures containing JavaScript instructions, ECMAScript (the specification for which is published by the European Computer Manufacturers Association International), VBScript™ (a trademark of Microsoft, Inc.) or any other client-side scripting language. In other words, the embedded software-application tool may include programs or procedures containing: JavaScript, ECMAScript instructions, VBScript instructions, or instructions in another programming language suitable for rendering by the web browser or another client application on electronic device 310.

Furthermore, the user may provide an image of a document, such as a financial document, for use by the financial software in performing a financial calculation(s) and/or in preparing an additional document(s). In particular, using electronic device 310 the user may provide the document to server 314 via network 312. As noted previously, in some embodiments, the user may take a picture of the document (for example, using a cellular telephone) and may submit the image to server 314. Alternatively, the user may submit a scanned image of the document or may submit a hard copy of the document (which is scanned by a provider of the financial software).

Server 314 may convert the image of the document into an electronic format that is suitable for text and numerical processing by performing character recognition. For example, using character-recognition software 316 that is resident on and which executes on server 314, the image of the document (and, in particular, financial information in the document) may be converted into a format that is usable for subsequent processing by the financial software (such as ASCII or another suitable digital format).

Then, using one or more items in the resulting electronic version of the document (such as the user's Social Security number, an employer identification number, etc.), an information-access program or module 318, which is resident on and which executes on server 314, may access stored information associated with the user and/or the user's employer (such as a financial record associated with the user) that is maintained by a third party, such as credit-card provider 324, payroll provider 326, bank 328, etc. Furthermore, using this accessed information, an error-handling program or module 320, which is resident on and which executes on server 314, may identify and correct errors in the electronic version of the document. In some embodiments, a calculation program or module 322, which is resident on and which executes on server 314, identifies and corrects additional errors in the electronic version of the document based at least on a predefined financial calculation associated with the document (such as a payroll-withholding calculation).

Subsequently, the financial software may use the corrected electronic version of the document to perform a financial calculation(s) and/or to prepare an additional document(s) (such as an income-tax return).

Note that the electronic version of the document and/or the stored information associated with the user and/or the user's employer may be stored on server 314 and/or at one or more other locations in computer system 300 (i.e., locally or remotely). Moreover, because this information may be sensitive in nature, it may be encrypted. For example, stored information and/or information communicated via network 312 may be encrypted.

Electronic devices and servers in computer system 300 may include one of a variety of devices capable of manipulating computer-readable data or communicating such data between two or more computing systems over a network, including: a personal computer, a laptop computer, a mainframe computer, a portable electronic device (such as a cellular phone or PDA), a server and/or a client computer (in a client-server architecture). Moreover, network 312 may include: the Internet, World Wide Web (WWW), an intranet, LAN, WAN, MAN, or a combination of networks, or other technology enabling communication between computing systems.

In exemplary embodiments, the financial software includes: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

Figure 4:
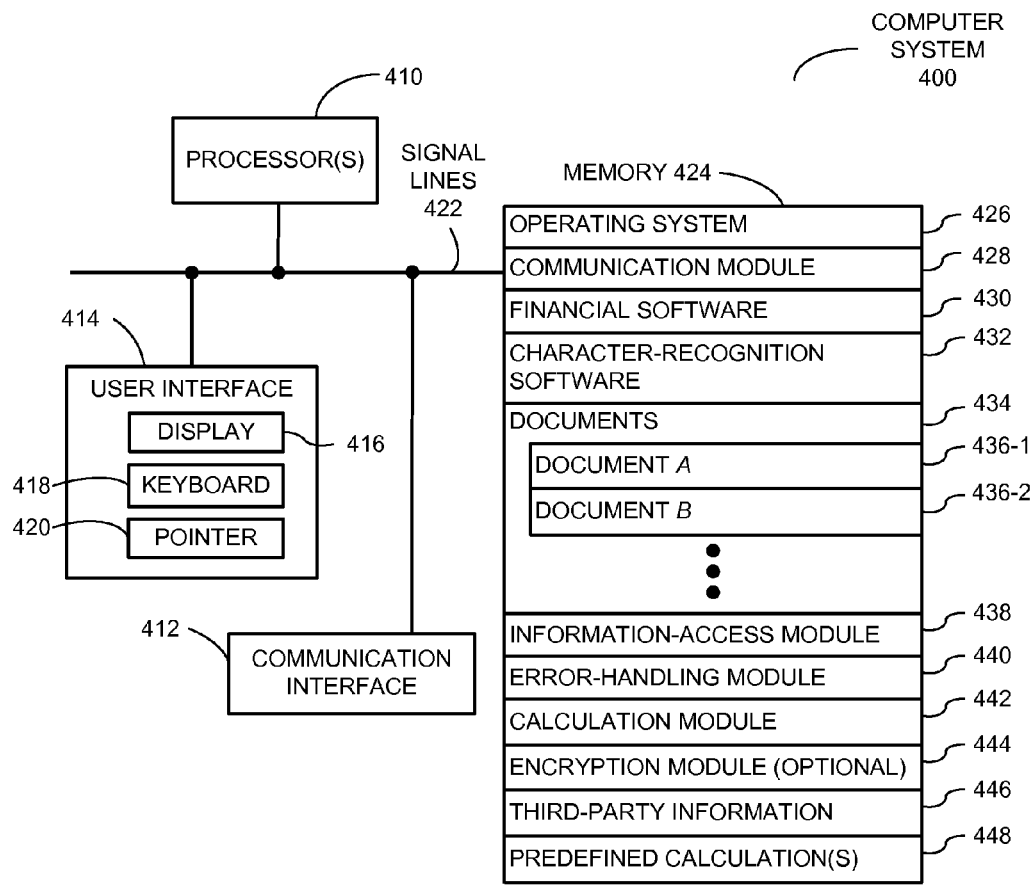
FIG. 4 is a block diagram illustrating a computer system that identifies and corrects errors in an electronic version of the document of FIG. 1 in accordance with an embodiment of the present disclosure.

FIG. 4 presents a block diagram illustrating a computer system 400 that identifies and corrects errors in an electronic version of document 100 (FIG. 1). Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to the computer system 400.

Memory 424 may also include multiple program modules (or sets of instructions), including: financial software 430 (or a set of instructions), character-recognition software 432 (or a set of instructions), information-access module 438 (or a set of instructions), error-handling module 440 (or a set of instructions), calculation module 442 (or a set of instructions), and/or optional encryption module 444 (or a set of instructions). As described previously, character-recognition software 432 may convert received images of documents 434 (such as document A 436-1 or document B 436-2) into an electronic format that is suitable for text and numerical processing. Then, information-access module 438 may access third-party information 446 that was stored and maintained by a third party. Next, error-handling module 440 may identify and correct any errors in the electronic version of documents 434 using the third-party information 446. Alternatively or additionally, calculation module 442 may identify and correct any errors in the electronic version of documents 434 based at least on predefined calculation(s) 448. Subsequently, financial software 430 may perform a financial calculation(s) and/or may generate an additional document(s) using the corrected electronic version of documents 434. Note that one or more of these program modules (or sets of instructions) may constitute a computer-program mechanism.

In some embodiments, at least some of the information stored in memory 424 and/or at least some of the information communicated using communication module 428 is encrypted using optional encryption module 444.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/ or one or more digital signal processors (DSPs).

Computer systems 300 (FIG. 3) and/or 400 may include fewer components or additional components. Moreover, two or more components may be combined into a single component, and/or a position of one or more components may be changed. In some embodiments, the functionality of the computer system 400 may be implemented more in hardware and less in software, or less in hardware and more in software, as is known in the art.

Figure 5:
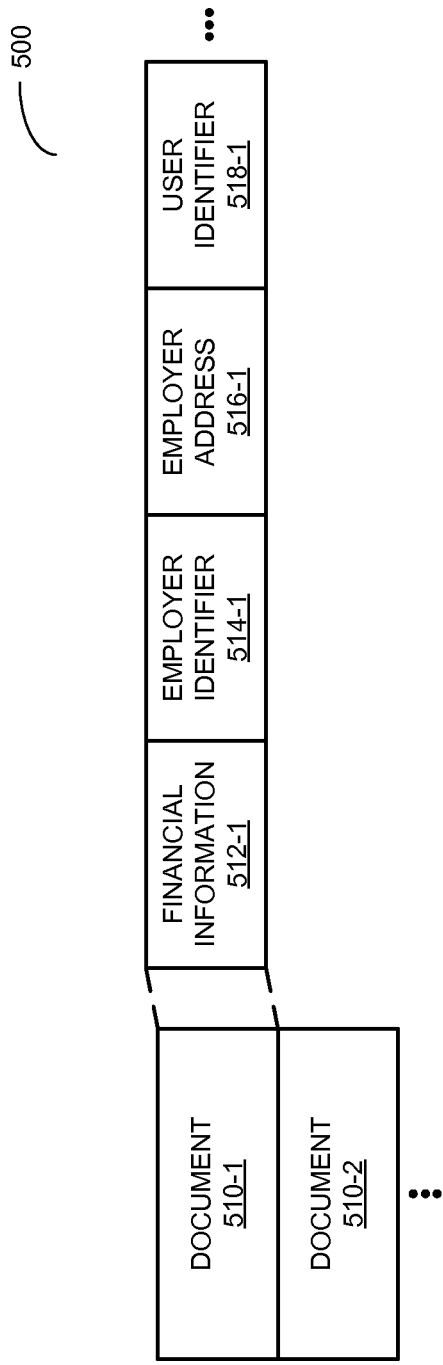
FIG. 5 is a block diagram illustrating a data structure for use in the computer systems of FIGS. 3 and 4 in accordance with an embodiment of the present disclosure.

We now discuss a data structure that may be used in computer systems 300 (FIG. 3) and 400. FIG. 5 presents a block diagram illustrating a data structure 500. This data structure may include documents 510. For example, document 510-1 may include: financial information 512-1, an employer identifier 514-1 (such as an employer name or an employer identification number), an employer address 516-1, and/or a user identifier 518-1 (such as a user name or a Social Security number).

In some embodiments of data structure 500, there may be fewer or additional components. Moreover, two or more components may be combined into a single component and/or a position of one or more components may be changed.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A computer-implemented method for identifying and correcting errors, comprising, at one or more computers for a financial software provider:
receiving, from a user, an image of a document that includes financial information;
performing character recognition on at least a portion of the image of the document to generate an electronic version of the financial information that is suitable for text and numerical processing;
accessing, from a third party, information stored in a computer readable storage medium based on at least one or more items in the electronic version financial information, wherein at least one or more of the items identifies the user;
comparing a predefined calculated value from the accessed information with a corresponding value from the electronic version of the financial information—to identify any errors between the two values;
if any errors are identified,
replacing the value from the electronic version with the value from the accessed information; and
using the value from the accessed information to prepare a tax-related document for the user.

2. The method of claim 1, wherein the image of the document includes an image of a financial document.

3. The method of claim 1, wherein the third party includes a payroll provider or a financial institution.

4. The method of claim 1, wherein the character recognition includes optical character recognition or intelligent character recognition.

5. The method of claim 1, wherein the user identifier includes a Social Security number of the user.

6. The method of claim 1, wherein the third party identifier includes an employer identification number of an employer of the user.

7. The method of claim 1, wherein the image of the document includes an income-tax document.

8. The method of claim 1, the method further comprising completing a field in an income-tax document based at least on the corrected electronic version of the financial information.

9. A computer-program product for use in conjunction with a computer system, the computer-program product comprising a non-transitory computer-readable storage medium and a computer-program mechanism embedded therein for configuring the computer system to identify and correct errors, the computer-program mechanism including:
instructions for receiving, from a user, at one or more computers for a financial software provider, an image of a document that includes financial information;
instructions for performing, at the one or more computers, character recognition on at least a portion of the image of the document to generate an electronic version of the financial information that is suitable for text and numerical processing;
instructions for accessing, from a third party, information stored in a computer readable storage medium based on at least one or more items in the electronic version financial information, wherein at least one or more of the items identifies the user;
instructions for comparing a predefined calculated value from the accessed information with a corresponding value from the electronic version of the financial information to identify any errors between the two values;
instructions for replacing, at the one or more computers, the errors in the electronic version of the financial information, if any errors are identified, with the value from the accessed information; and
instructions for using, at the one or more computers, the value from the accessed information to prepare a tax-related document for the user.

10. The computer-program product of claim 9, wherein the image of the document includes an image of a financial document.

11. The computer-program product of claim 9, wherein the user identifier includes a Social Security number of the user.

12. The computer-program product of claim 9, wherein the third party identifier includes an employer identification number of an employer of the user.

13. The computer-program product of claim 9, wherein the image of the document includes an income-tax document.

14. The computer-program product of claim 9, the computer-program mechanism further comprising instructions for completing a field in an income-tax document based at least on the corrected electronic version of the financial information.

15. A computer system, comprising:
a processor;
memory;
a program module, wherein the program module is stored in the memory and configurable to be executed by the processor to identify and correct errors, the program module including:
instructions for receiving, from a user, at one or more computers for a financial software provider, an image of a document that includes financial information;
instructions for performing, at the one or more computers, character recognition on at least a portion of the image of the document to generate an electronic version of the financial information that is suitable for text and numerical processing;
instructions for accessing, from a third party, information stored in a computer readable storage medium based on at least one or more items in the electronic version financial information, wherein at least one or more of the items identifies the user;
instructions for comparing a predefined calculated value from the accessed information with a corresponding value from the electronic version of the financial document to identify any errors between the two values;
instructions for replacing, at the one or more computers, the errors in the electronic version of the financial information, if any errors are identified, with the value from the accessed information; and
instructions for using, at the one or more computers, the value from the accessed information to prepare a tax-related document for the user.

16. The method of claim 1, wherein preparing the tax-related document comprises preparing, at the one or more computers for the financial software provider, an income-tax return for the user, and
wherein using the value from the accessed information to prepare the tax-related document comprises using the value from the accessed information to complete, at the one or more computers for the financial software provider, a field in the income-tax return for the user.

17. The method of claim 1, wherein the third party comprises a payroll provider.

\* \* \* \* \*